(12) United States Patent
Kimata

(10) Patent No.: US 6,465,784 B1
(45) Date of Patent: *Oct. 15, 2002

(54) INFRARED SOLID-STATE IMAGING SENSING DEVICE

(75) Inventor: Masafumi Kimata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/581,808

(22) PCT Filed: Dec. 18, 1997

(86) PCT No.: PCT/JP97/04676

§ 371 (c)(1),
(2), (4) Date: Jun. 19, 2000

(87) PCT Pub. No.: WO99/31471

PCT Pub. Date: Jun. 24, 1999

(51) Int. Cl.[7] .................................................. G01J 5/20
(52) U.S. Cl. .................. 250/332; 250/338.1; 250/338.3
(58) Field of Search ............................. 250/332, 338.1, 250/338.4, 339.02, 349, 370.08, 370.14; 252/431, 436, 467, 470; 438/54, 57

(56) References Cited

U.S. PATENT DOCUMENTS

| 5,286,976 | A | | 2/1994 | Cole | |
|---|---|---|---|---|---|
| 5,554,849 | A | * | 9/1996 | Gates | 250/370.08 |
| 5,589,688 | A | * | 12/1996 | Kimura et al. | 250/338.4 |
| 5,998,778 | A | | 12/1999 | Kimata | |
| 6,031,231 | A | | 2/2000 | Kimata et al. | 250/332 |
| 6,211,520 | B1 | * | 4/2001 | Ishikawa et al. | 250/338.1 |

OTHER PUBLICATIONS

R.A. Wood, IEEE, Tech. Digest of IEDM, pp. 175–177, "High–Performance Infrared Thermal Imaging with Monolithic Silicon Focal Planes Operating at Room Temperature", 1993.

Paul W. Kruse, SPIE, vol. 2552, pp. 556–563, "Uncooled IR Focal Plane Arrays", 1995.

Ryouji Asahi, et al., Technical Digest of the 11th Sensor Symposium, pp. 99–102, "An Infrared Imaging Sensor Using Poly–Silicon P–N Junction Diodes", 1992.

* cited by examiner

Primary Examiner—Constantine Hannaher
Assistant Examiner—Albert Gagliardi
(74) Attorney, Agent, or Firm—Oblon, Spivak, McClelland, Maier & Neustadt, P.C.

(57) ABSTRACT

Infrared solid-state imaging elements include an infrared absorbing section formed as to correspond to each pixel aligned in a two-dimensional pattern for absorbing incident infrared radiation and converting the same into heat. A temperature detector section is formed as to correspond to each pixel on a semiconductor substrate and are arranged of a plurality of serially connected silicon pn junction diodes that are biased in a forward direction. A hollow section is formed on each region on which the temperature detector section is formed on the semiconductor substrate. Supporting mechanisms are arranged of materials exhibiting large thermal resistance and which support the temperature detector portion above the hollow section on the semiconductor substrate. A joint column thermally couples the infrared absorbing section and the temperature detector section.

15 Claims, 12 Drawing Sheets

INFRARED SOLID-STATE IMAGING SENSING DEVICE

BACKGROUND OF THE INVENTION

Field of the Invention present invention relates to two-dimensional infrared solid-state imaging elements employing a thermal type infrared detector for detecting and absorbing incident infrared radiation and converting the same into heat.

DISCUSSION OF THE INVENTION

A thermal type infrared detector is a device which temperature is raised upon irradiation of infrared radiation by absorbing the irradiated infrared radiation that further performs detection of temperature changes.

FIG. 11 is a bird's-eye view showing an example of an arrangement of a single pixel of two-dimensional infrared solid-state imaging elements employing a conventional thermal type infrared detector utilizing a thermal type thin-film which resistance value is changed depending on temperature.

In the drawing, 1 denotes a semiconductor substrate comprised of semiconductors of e.g. silicon, 10 an infrared detector section being disposed in a spaced relationship with respect to the semiconductor substrate 1, 11 a thermal type thin-film, 21, 22 supporting legs for lifting and holding the infrared detector section 10 above the silicon semiconductor substrate, 31, 32 metallic wirings for supplying current to the thermal type thin-film, 40 a switching transistor for switching between ON and OFF of current running through the thermal type thin-film 11 and the metallic wirings 30, 31, 60 a control clock wire for controlling ON and OFF conditions of the switching transistor, and 70 a metallic reflecting film for forming an optical resonance structure with the detector section in order to increase the absorption of infrared radiation at the infrared detector section 10.

FIG. 12 is a view showing a sectional arrangement along current paths of the structure of a pixel of the two-dimensional solid-state imaging elements employing a conventional thermal type infrared detector as shown in FIG. 11 wherein the switch-transistor 40, signal wire 50 and control clock wire 60 are omitted since these are not directly concerned in the present invention.

As already mentioned, the thermal type thin-film 11 is formed above the infrared detector section 10 wherein the metallic wiring 31, 32 are connected to the thermal type thin-film 11 and further connected via contact portions 122, 122 to a signal read out circuit (not shown) formed on the silicon semiconductor substrate.

The thermal type thin-film 11 and metallic wiring 31, 32 are covered by insulating films 100, 110 of silicon dioxide film or silicon nitride film wherein these insulating films 100, 110 constitute the mechanical structure of the infrared detector section 10 and supporting legs 21, 22. 80 denotes an insulating film for insulating the signal read out circuit and the wiring 31, 32 that are formed on the semiconductor substrate 1, and the light detector section 10 is disposed above the metallic reflecting film 70 above the insulating film 80 with a hollow section 90 being interposed therebetween. Another insulating film may be formed on the surface of the metallic reflecting film 70.

Next, operations of conventional two-dimensional solid-state imaging elements employing such a thermal type infrared detector will be explained.

Infrared radiation is made incident from a side at which the light detector section 10 is disposed and is absorbed by the light detector section 10.

Owing to the presence of the metallic reflecting film 70, stationary waves of incident infrared radiation wherein the position of the metallic reflecting film 70 forms a node are formed, and by suitably setting the distance between the infrared detector section 10 and the metallic reflecting film 70, absorption of infrared energy can be increased in the infrared detector section 10.

Infrared energy that has been absorbed at the infrared detector section 10 is converted into heat and increases the temperature of the infrared detector section 10. The degree of temperature rise is dependent on the amount of incident infrared radiation (while the amount of incident infrared radiation is dependent on the temperature and thermal emissivity of an object to be picked up).

Since the degree of temperature rise can be known by measuring a change in resistance values of the thermal type thin-film 11, the amount of infrared radiation that is emitted by the object to be picked up can be known from changes in resistance values of the thermal type thin-film 11.

As a material for the bolometer that exhibits large changes in resistance owing to changes in temperature, semiconductors of vanadium oxide (VOx) or the like may be employed as known from reference P. W. Krise, "Uncooled IR Focal Plane Arrays", Proceedings of SPIE, vol. 2552, pp. 556–563.

In case resistance temperature coefficients of thermal type thin-films 11 are identical, the larger the temperature rise of the infrared detector section 10 is, the larger the change in resistance that is obtained by an identical amount of incident infrared radiation becomes, and the higher the sensibility becomes. In order to increase the degree of temperature rise, it is effective to reduce the amount of heat escaping from the infrared detector section 10 to the silicon semiconductor substrate 1 as little as possible, and due to this fact the supporting legs 21, 22 are designed as to limit thermal resistance as much as possible.

It is also important to set a thermal capacity of the infrared detector section 10 small such that a temperature time constant of the infrared detector section 10 becomes smaller than a frame time of the imaging elements.

While infrared radiation is made incident into entire pixels, only those that are made incident into a portion of the infrared detector section 10 contribute to the temperature rise of the infrared detector portion 10 (although some amount of infrared radiation that is made incident into the supporting legs which are close to the infrared detector section 10 are also effective), and infrared radiation that is made incident into remaining regions become ineffective.

Due to this fact, it can be easily understood that it is also effective to increase an aperture ratio (a ratio of an area of the infrared detector section 10 with respect to an area of the pixel) for increasing the sensitivity.

In a method for detecting changes in temperature by using a borometer as explained above based on a conventional example, it is necessary to employ a material of large change in resistance caused by temperature and low noise such as vanadium oxide (VOx) that is usually not used in a silicon process.

While such a material can be treated in film-forming, photolithograpy or etching processes using similar manufacturing techniques as known for silicon processes, it has been difficult to perform processes in manufacturing lines that are used for silicon VLSI in view of contamination of silicon processes.

Further, in the arrangement of the conventionally known infrared solid-state imaging device as shown in FIG. 11 and FIG. 12, the infrared detector section 10 needs to be formed at most on a region other than the supporting legs 21, 22 and contact portions for connecting these supporting legs and the read out circuit that is formed on the silicon semiconductor substrate 1, whereby the aperture ratio was restricted by the design of the supporting legs, contact portions and interval clearance between these portions and the infrared detector section 10 such that high sensitivity could not be obtained.

Such problems became more remarkable the smaller the pixels were so that it was difficult to obtain high resolution using small pixels while maintaining proper sensitivity.

The present invention has been made in view of the above problems, and it is a purpose of the present invention to provide infrared solid-state imaging elements which are two-dimensional infrared solid-state imaging elements that form a thermal type infrared detector on a same semiconductor substrate as a signal read out circuit is formed, wherein all processes except for a final process of eliminating a sacrificial layer (in case an underlying layer is etched and an overlying is maintained, the underlying layer that is removed is generally called a sacrificial layer) can be performed in a conventional silicon VLSI manufacturing line, and wherein it can be realized for a thermal type infrared detector which is capable of achieving a high aperture ratio without being dependent on the design of supporting legs, metallic wiring or contacts which constitute a heat insulating structure, whereby it is enabled to provide infrared solid-state imaging elements which can be obtained through simple manufacturing processes and which exhibit high sensitivity.

SUMMARY

Infrared solid-state imaging elements of the present invention are comprised with an infrared absorbing section that is formed as to correspond to each pixel aligned in a two-dimensional pattern for absorbing incident infrared radiation and converting the same into heat, a temperature detector section that is formed as to correspond to each pixel on a semiconductor substrate and are arranged of a plurality of serially connected silicon pn junction diodes that are biased in a forward direction, a hollow section formed on each region on which the temperature detector sections is formed on the semiconductor substrate, supporting mechanisms that are arranged of materials exhibiting large thermal resistance and which support the temperature detector portion above the hollow section on the semiconductor substrate, and a joint column for thermally coupling the infrared absorbing section and the temperature detector section. With this arrangement, all of manufacturing processes except for eliminating sacrificial layers can be performed in a silicon VLSI process line, and due to the fact that active elements other than silicon pn junction diodes used in the temperature detectors can be eliminated out of pixel portions, infrared solid-state imaging elements can be manufactured in a stable manner which exhibit improved productivity, which are of low cost, and which are highly uniform.

Further, the arrangement of the infrared absorbing section and temperature detector section as separated layers and the provision of the joint column which is a means for mechanically and thermally coupling the infrared absorbing section and temperature detector section, the area of the infrared absorbing section which practically determines the aperture ratio can be increased to thereby obtain high aperture ratio and high sensitivity.

Also, according to the infrared solid-state imaging elements of the present invention, by employing a SOI substrate as the semiconductor substrate, the silicon pn junction diodes for detecting the temperature can easily be formed by using crystal Si as a constituent member.

The silicon pn junction diodes of the temperature detector section for the infrared solid-state imaging elements of the present invention are formed in that a plurality of silicon pn junction diodes are arranged by alternately forming a p-layer and n-layer on a single crystal silicon layer, and in that the diodes are connected through metallic wiring between connections in a reverse direction at the time of applying voltage. With this arrangement, silicon pn junction diodes can be disposed at high density within a restricted region of an area for the pixels, and the number of silicon pn junction diodes can be increased to thereby achieve high sensitivity.

According to the infrared solid-state imaging elements of the present invention, platinum silicide that is formed in a self-aligned manner at an aperture portion is used as metallic wiring for short-circuiting of the wiring whereby simplification of processes can be achieved.

According to the infrared solid-state imaging elements of the present invention, a p-type semiconductor substrate is employed as the semiconductor substrate and the plurality of serially connected silicon pn junction diodes of the temperature detector section-that are biased in a forward direction are formed within n-type impurity region layers that are formed on the p-type semiconductor, whereby no insulating film is required below the temperature detector section but it can be coped with electrolytic etching so that conventional substrates that are cheaper than SOI substrates can be employed as semiconductor substrates.

According to the infrared solid-state imaging elements of the present invention, the infrared absorbing section is formed of an infrared absorbing metallic thin-film, insulating layer and a metallic reflecting film whereby it can be achieved for improving absorption of infrared radiation by arranging the infrared absorbing section to be thin and to be of an interference absorbing structure, and thus for achieving high sensitivity.

According to the infrared solid-state imaging elements of the present invention, the infrared absorbing section is formed of an insulating layer and a metallic reflecting film, a process of forming an infrared absorbing metallic thin-film can be eliminated such that simplification of manufacturing processes can be achieved.

According to the infrared solid-state imaging elements of the present invention, since the joint column is formed of a part of composition members of the infrared absorbing section, the joint column can be simultaneously formed with the infrared absorbing section such that simplification of manufacturing processes can be achieved.

Further, according to the infrared solid-state imaging elements of the present invention, it has been provided for an etching stop layer exhibiting etching resistivity against an etchant for etching the hollow section at peripheral portions of a region-for forming the hollow section within the semiconductor substrate. With this arrangement, there is no fear that etching is unnecessarily spread, margins between structures that are to be formed on regions to be etched and regions not to be etched can be made small, and high densification of silicon pn junction diodes for temperature detection is enabled owing to the gained regions for the temperature detector section.

Further, since the distance between each of the pixels can be made small, the pixels can be consequently made smaller such that the small sized pixels can be disposed at high density.

Also, according to the infrared solid-state imaging elements of the present invention, constant-current sources one end of which is connected to a fixed potential are provided for each vertical line. With this arrangement, the constant-current sources provide load for detecting output signals for each of the vertical lines, and time for electric conduction can be set to be longer for each single pixel even though the number of pixels is increased whereby reading out of signals can be satisfactorily performed and noise of output signals can be decreased by providing narrow bandwidths.

According to the infrared solid-state imaging elements of the present invention, resistances one end of which is connected to a fixed potential are provided for each vertical line. With this arrangement, the resistances provide load for detecting output signals for each of the vertical lines, and time for electric conduction can be set to be longer for each single pixel even though the number of pixels is increased whereby reading out of signals can be satisfactorily performed and noise of output signals can be decreased by providing narrow bandwidths.

According to the infrared solid-state imaging elements of the present invention, diodes one end of which is connected to a fixed potential are provided for each vertical line. With this arrangement, the diodes provide load for detecting output signals for each of the vertical lines, and time for electric conduction can be set to be longer for each single pixel even though the number of pixels is increased whereby reading out of signals can be satisfactorily performed and noise of output signals can be decreased by providing narrow bandwidths.

According to the infrared solid-state imaging elements of the present invention, the diodes which one end is connected to a fixed potential for each vertical line are arranged in that the same number of diodes of identical shape are serially connected as the silicon pn junction diodes of the temperature detector section for the pixels. With this arrangement, characteristics are varied similarly to silicon pn junction diodes of the temperature detector section in accordance to changes in temperature of the pixels such that the compensation of changes in output owing to changes in pixel temperature is enabled.

According to the infrared solid-state imaging elements of the present invention, each of the vertical lines are provided with common load one end of which is connected to a fixed potential via a horizontal selective transistor, whereby nonuniformity in output signals owing to nonuniformity in load for each vertical line can be eliminated.

According to the infrared solid-state imaging elements of the present invention, the common load with respect to each of the vertical lines are diodes arranged in that the same number of diodes of identical shape are serially connected as the silicon pn junction diodes of the temperature detector section. With this arrangement, nonuniformity in output signals owing to nonuniformity in load for each vertical line can be eliminated and characteristics are varied similarly to silicon pn junction diodes of the temperature detector section in accordance to changes in temperature of the pixels such that the compensation of changes in output owing to changes in pixel temperature is enabled.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

Further.

Still further.

DESCRIPTION OF THE PREFERRED EMBODIMENTS

Figure 1:
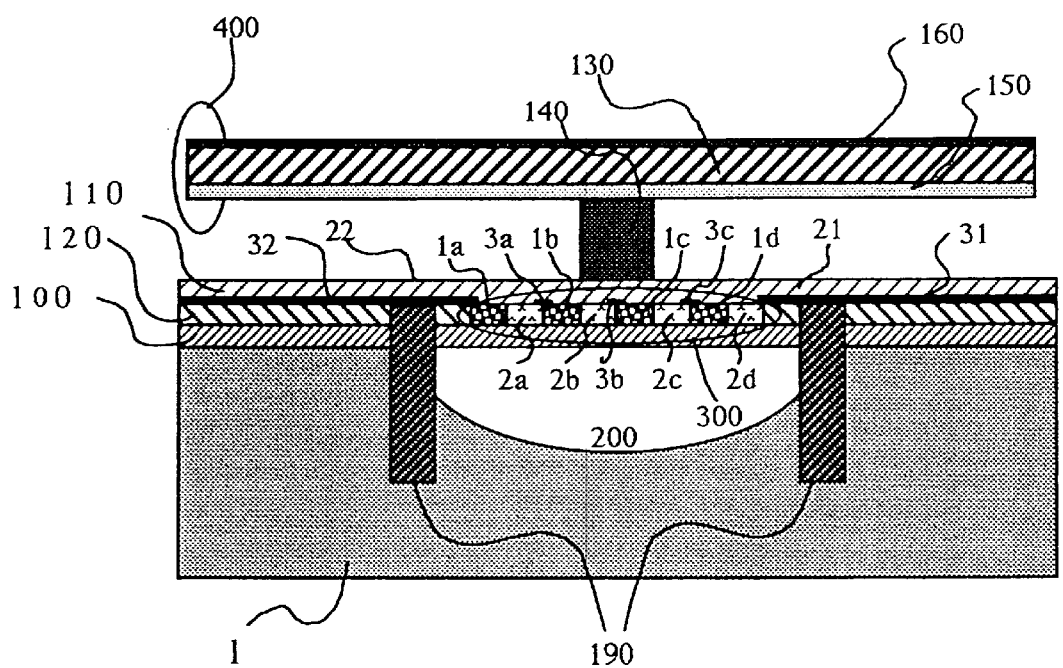
FIG. 1 is a view showing a sectional arrangement of pixels of infrared solid-state imaging elements according to a first embodiment of the present invention.

The present invention will now be explained in details based on the accompanying drawings. It should be noted that reference numerals that are identical to those of the conventional art denote identical or similar items.

First Embodiment

FIG. 1 is a view showing a sectional arrangement of pixels of two-dimensional infrared solid-state imaging elements employing a thermal type infrared detector indicating a first embodiment of the present invention.

In FIG. 1, wiring for reading out signals that are formed on semiconductor substrate 1 are omitted for the purpose of simplification.

As for the semiconductor substrate 1, it is employed a SOI (Silicon on Insulator) semiconductor substrate wherein 100 denotes an insulating layer that is formed of silicon dioxide film and embedded in the SOI semiconductor substrate 1, 300 a temperature detector section formed on the insulating layer 100 which is formed of serial silicon pn junction diodes including n-type silicon regions (also called n-type impurity regions) 1a, 1b, 1c, 1d and p-type silicon regions (also called p-type impurity regions) 2a, 2b, 2c, 2d.

Short-circuiting between 2a and 1b, 2b and 1c, and 2c and 1d is performed through metallic wiring for short-circuiting 3a, 3b, 3c and only portions between 1a and 2a, 1b and 2b, 1c and 2c, and 1d and 2d effectively function as pn junction diodes.

Further, 110, 120 are insulating films of silicon dioxide film or silicon nitride film, and 31, 31 are metallic wiring. 21, 22 are supporting legs for supporting the temperature detector section 300 above the hollow section 200 formed in the SOI semiconductor substrate 1. The insulating films 100, 110, 120 and a part of the metallic wiring 31, 32 constitute the structure of the supporting legs 21, 22.

400 that is formed above the temperature detector section 300 denotes an infrared absorbing section for absorbing infrared radiation for conversion into heat, and the infrared absorbing section 400 is comprised of the metallic reflecting film 150, insulating film 130, and infrared absorbing metallic thin-film 160.

Further, 140 denotes a joint column which is a means for holding the infrared absorbing section 400 apart from the temperature detector section 300 as well as. for thermally coupling the infrared absorbing section 400 and the temperature detector section 300.

190 denotes an etching stop layer which is an etching stopper for preventing that etching is unnecessarily progressed in case isotropic etching is employed for forming the hollow section 200.

Figure 2:
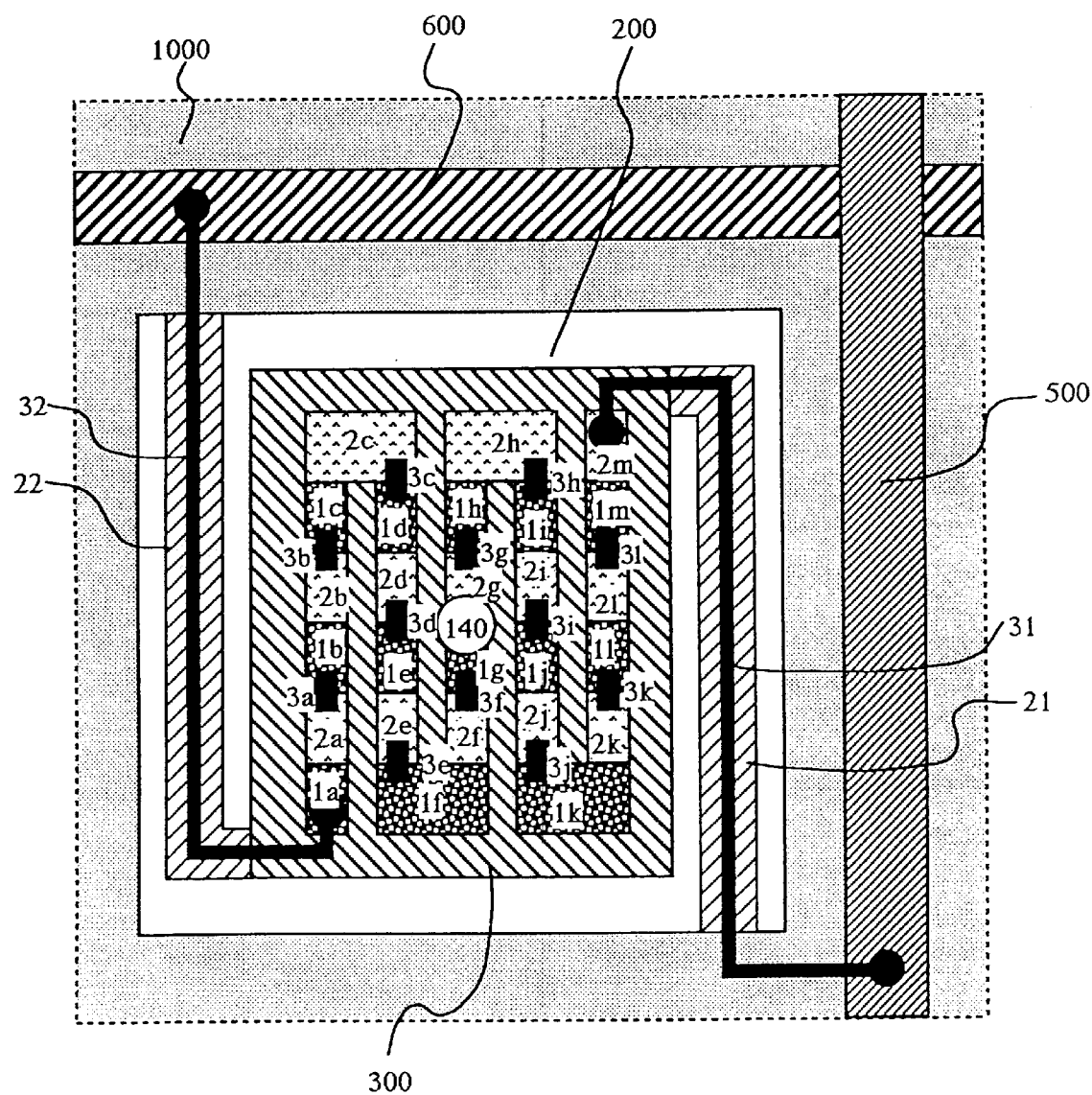
FIG. 2 is a view showing a planar layout of the pixels of the infrared solid-state imaging elements according to the first embodiment of the present invention wherein the infrared absorbing section has been omitted.

FIG. 2 is a view showing a planar layout of an arrangement of pixels of two-dimensional infrared solid-state imaging elements employing the infrared absorbing section (thermal type infrared detector) according to the first embodiment as shown in FIG. 1 wherein the infrared absorbing section 400 has been omitted.

In the drawing, 1000 denotes an entire pixel, 500 a vertical signal wire for reading out signals and 600 a bias wire for supplying voltage to the serial silicon pn junction diodes (hereinafter simply called as serial diodes or also diodes) as already discussed.

Further, 1a to 1 m indicate n-type silicon regions (n-type impurity regions), 2a to 2 m p-type silicon regions (p-type impurity regions) and 3a to 31 metallic wiring for short-circuiting. It should be noted that the number of serial diodes has increased in FIG. 2 than compared to that of FIG. 1, since the sensitivity can be improved the more diodes are connected, it is desirable that numerous diodes are disposed in a meandering manner as shown in FIG. 2.

While the supporting legs 21, 22 and metallic wiring 31, 32 in the description assume simple shapes as known from conventional arrangements, it is preferable that length be gained through methods of layout such as meandering in order to increase thermal resistance.

Figure 3:
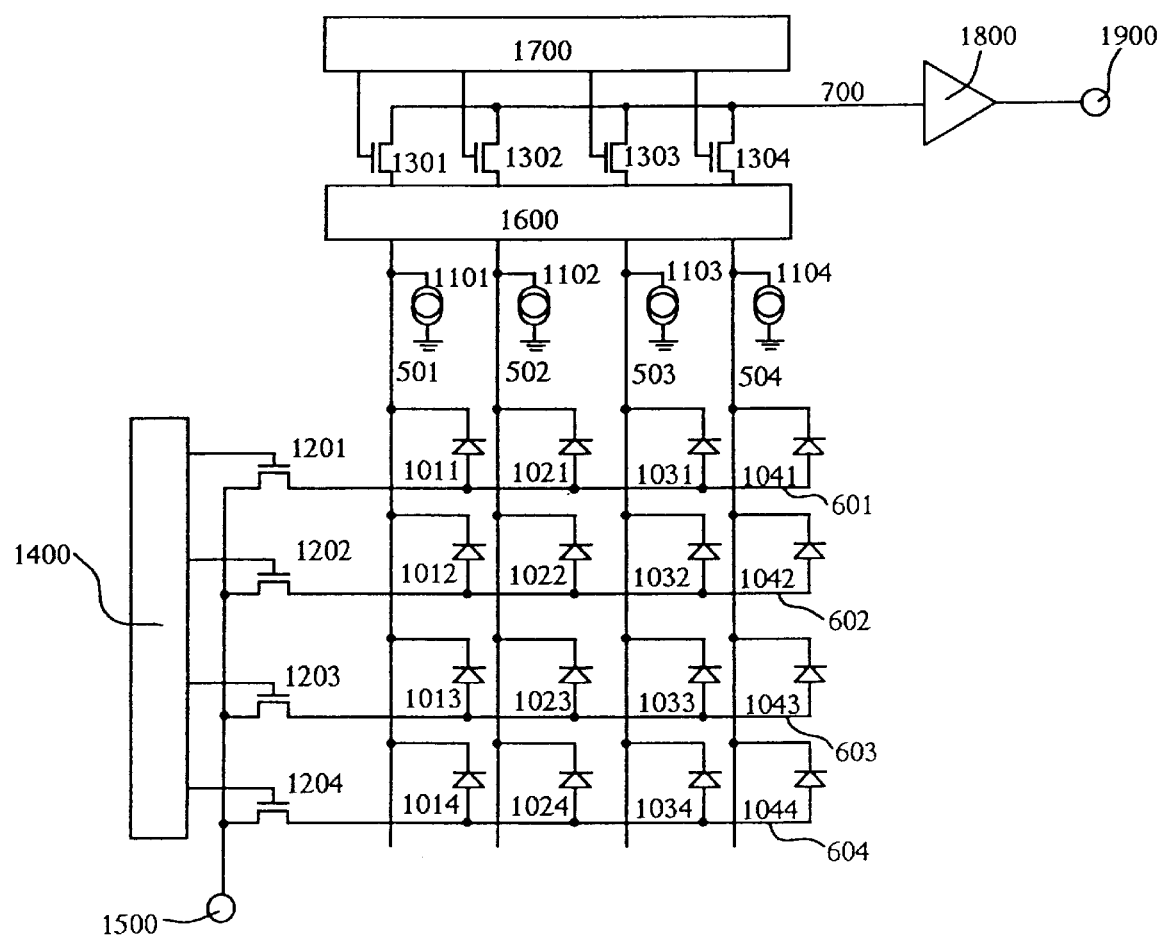
FIG. 3 is a view showing an arrangement of a read out circuit for the infrared solid-state imaging elements according to the first embodiment of the present invention.

FIG. 3 is a view showing an arrangement in which the plurality of pixels as shown in FIG. 1 and FIG. 2 are disposed in a form of a matrix to comprise imaging elements (while a pixel array of 4×4 is shown in the drawing for simplifying purposes, there will actually be several ten thousands to several hundred thousands of pixels).

In the drawing, 1011 to 1044 indicate pixels that have been denoted as 1000 in FIG. 2, and the serial pn junction diodes in each of the pixels are expressed by a single symbol for the diodes in FIG. 3 for the purpose of simplification.

501 to 504 and 601 to 604 respectively correspond to reference numerals 500 and 600 in FIG. 2 and indicate vertical signal wires and bias wires.

1201 to 1204 and 1301 to 1304 denote vertical and horizontal transistors which are actuated by clock from vertical and horizontal scanning circuits 1400 and 1500, 1600 denotes a vertical-horizontal interface circuit for sample-and-holding signals which appeared at vertical signal wires 501 to 504 and outputting these to a horizontal signal wire 700, 1800 an output amplifier, 1500 a bias power source, and 1900 an output terminal.

Further, 1101 and 1104 are constant-current sources functioning as load each of which are arranged in that one end thereof is connected to a fixed potential per respective vertical line, wherein these may be comprised of MOS transistors operating in saturation region or bipolar transistors.

Figure 4:
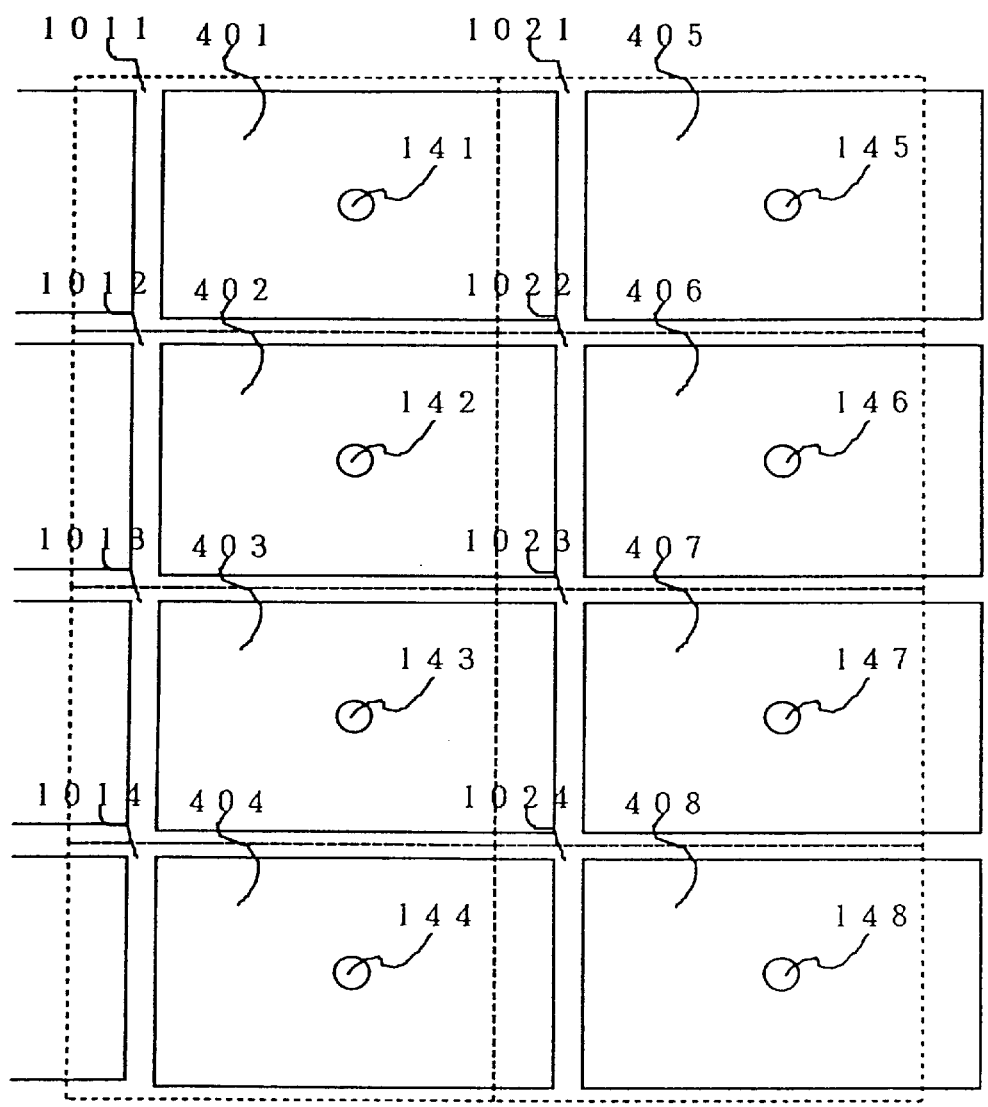
FIG. 4 is a view showing a layout of the infrared absorbing section of the infrared solid-state imaging elements according to the first embodiment of the present invention.
Figure 5A:
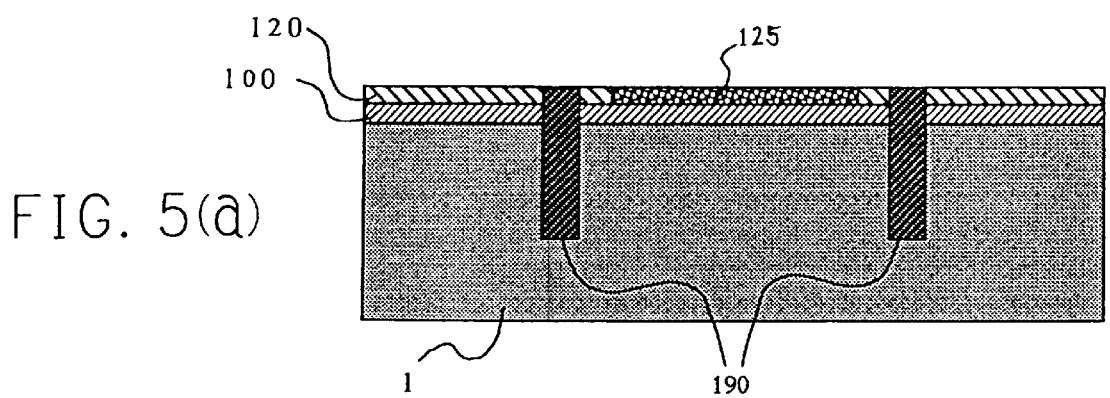
FIG. 5 is a view showing a flow of manufacturing processes of pixels of the infrared solid-state imaging elements according to the first embodiment of the present invention.
Figure 5B:
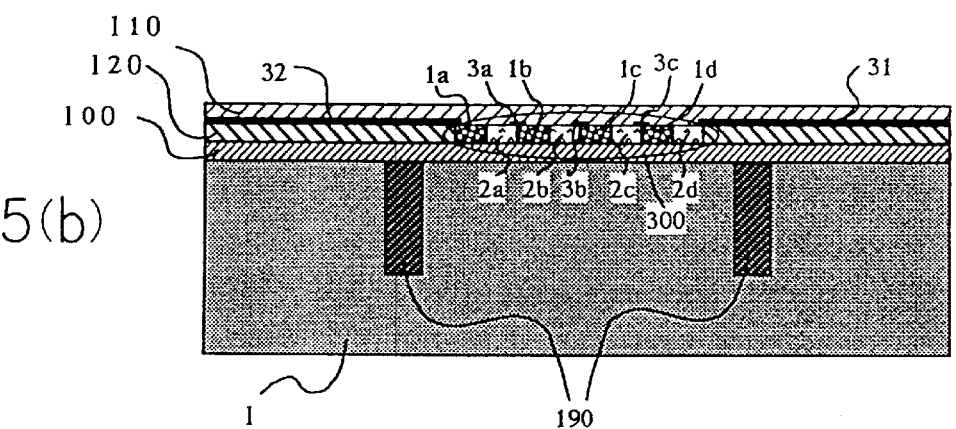
Figure 5C:
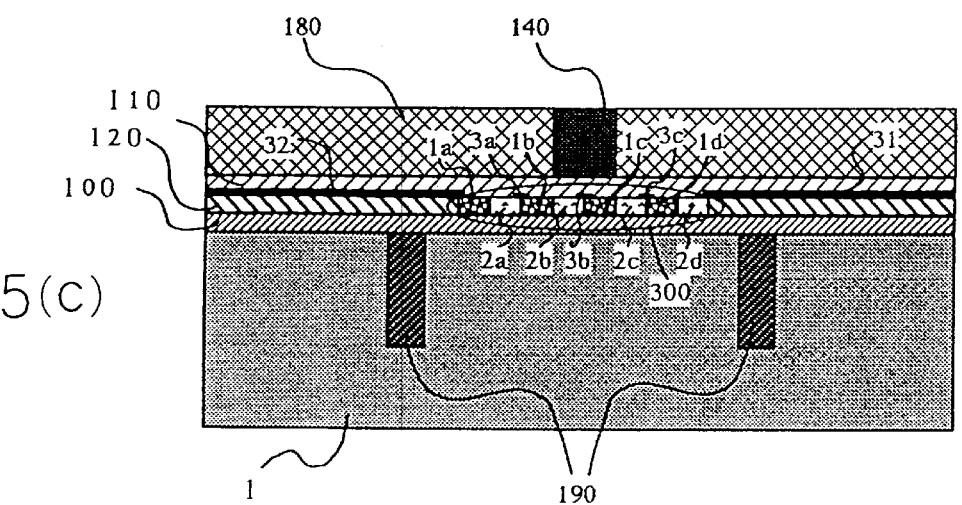
Figure 5D:
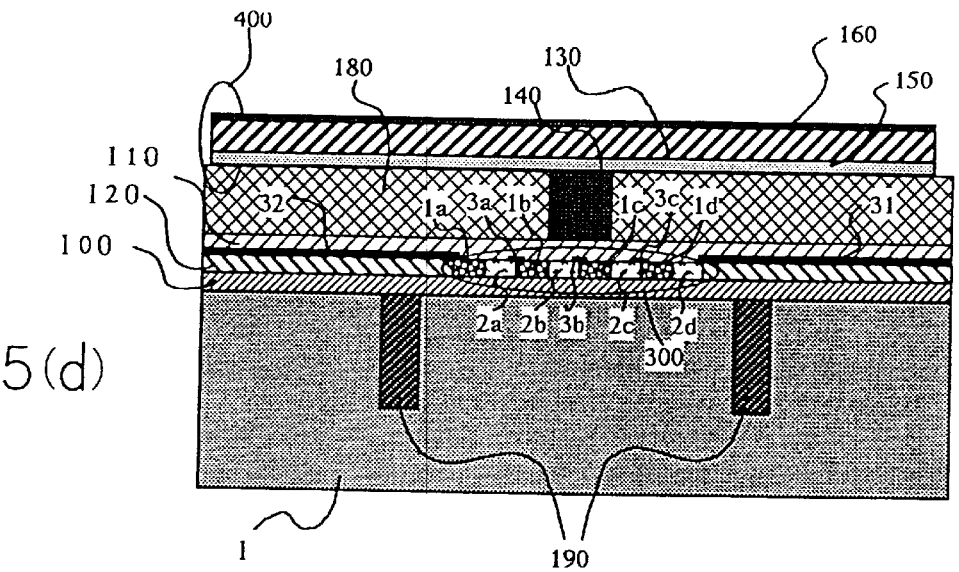
Figure 5E:
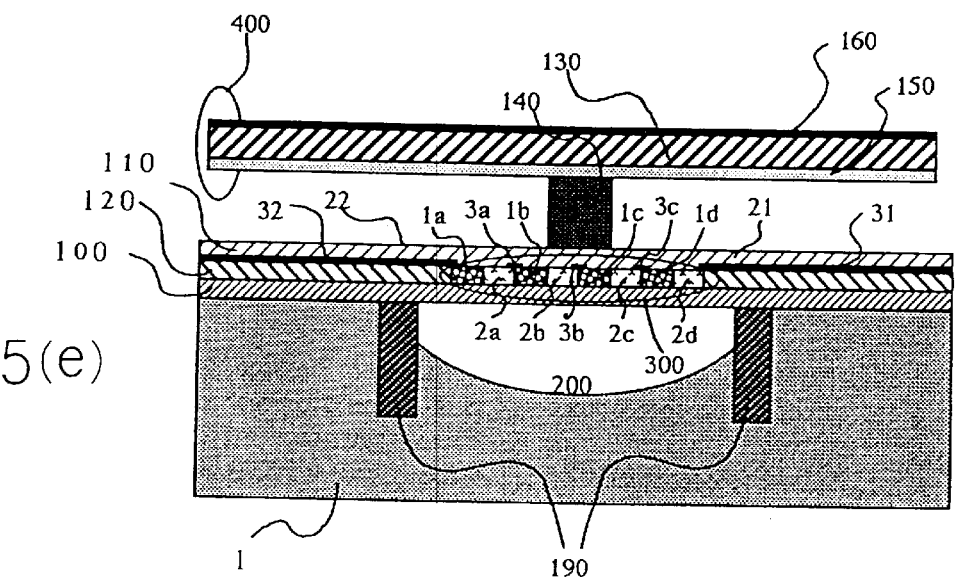

FIG. 4 is a view showing the plurality of pixels as shown in FIG. 1 and FIG. 2 in a disposed condition.

In the drawing, the rectangles 1011 to 1024 as indicated by dashed lines indicate pixels denoted as 1000 in FIG. 2, and the arrangement of the contents of the pixels is omitted expect for the joint columns 141 to 148.

401 to 408 respectively indicate the infrared absorbing section 400 as shown in FIG. 1 which are supported to be apart from the semiconductor substrate 1 through the joint columns 141 to 148. It is not necessary to form the pixels 1011 to 1024 formed on the upper surface of the semiconductor substrate 1 and the infrared absorbing sections 401 to 408 on an identical region, and these may also be shifted with respect to the pixels as shown in FIG. 4.

As it is evident from the drawings, the respective areas of the infrared absorbing sections 401 to 408 may be areas corresponding to the area for the pixels excluding minor spaces formed between adjoining infrared absorbing sections, whereby an aperture ratio (ratio of the area for infrared absorbing sections with respect to an area for the pixels) can be remarkably made high.

Next, operations of the two-dimensional infrared solid-state imaging elements employing the thermal type infrared detector according to the present embodiment will now be explained.

Infrared radiation is made incident from the side of the infrared absorbing section 400. Incident infrared radiation is absorbed at the infrared absorbing section 400 and the temperature of the infrared absorbing section 400 is raised.

Changes in temperature of the infrared absorbing section 400 is transmitted to the temperature detector section 300 via the joint column 140 such as to raise the temperature of the temperature detector section 300.

The thermal resistance of the joint column 140 is designed to be smaller than the thermal resistance of the supporting legs 21, 22, and a time constant that is determined by a summed thermal capacity of three components, that is, the temperature detector section 300, joint column 140 and the infrared absorbing section 400 and by the thermal resistance of the supporting legs 21, 22 is set to be shorter than a frame time (time required for reading out entire signals corresponding to a single screen surface or time required for reading the signals of the entire pixels of the solid-state imaging elements). With this arrangement, in case observation is performed per frame time, the rise in temperature of the temperature detector section 300 is almost identical to the rise in temperature of the infrared absorbing section 400.

Next, it will be explained for a method for obtaining electric signals from changes in temperature of pixel portions based on FIG. 3.

Operations of imaging elements during an arbitrary single horizontal period will be considered. First, one clock output of the vertical scanning circuit 1400 reaches a "H (high level)" condition whereupon one of the vertical selective transistors 1201 to 1204 is switched ON and (voltage from) bias power source 1500 is applied on either one of bias wires 601 to 604.

Though not shown in the circuit, unselected bias wires assume "L (low level)" conditions in which they are not biased.

For instance, in which a gate (vertical selective transistor) of 1202 is impressed with a clock to assume an ON condition, bias voltage is applied on the bias wire 602 and the bias wires 601, 603, 604 are not applied with voltage.

In this condition, only the diodes of pixels 1012, 1022, 1032, 1042 assume a condition in which they are biased in a forward direction, and the diodes of the remaining pixels assume a condition in which they are biased in a reverse direction.

In this condition, current is made to pass from the power source 1500 to the vertical selective transistor 1202 and the vertical bias wire 602 and is parted into four, whereupon one is made to flow from pixel 1012 through the vertical signal wire 501 to current source 1101, another from 1022 through 502 to 1102, and still another from 1032 through 503 to 1103 and the last one from 1042 through 504 to 1104.

In this manner, although pixels only contain diodes for temperature detection, selected pixels are only pixels of biased line.

As for diodes through which constant-current is made to flow in a forward direction, single elements are already used in practice as temperature sensors (e.g. those of silicon diode sensor DT series manufactured by Lake Shore Cryotronics, Inc.), and it is known that an amount of voltage to be impressed that is required for making constant-current varies depending on temperature.

More particularly, in one silicon pn diode, the voltage decreases by approximately 2 to 2.5 mV per 1 degree of rise in temperature. The change in voltage owing to temperature is proportional to the number of diodes to be connected in a serial manner.

Therefore, in the above-described example, the amount of voltage decrease caused by the diodes contained in the pixels reflecting the temperature of each of the pixels of 1012, 1022, 1032, 1042 differs, and voltage reflecting the temperature of pixels 1012, 1022, 1032, 1042 appear at 501, 502, 503, 504. Sample-and-holding of these voltages is performed at the vertical-horizontal interface section 1600, and signals are read out to the exterior through the horizontal signal wire 700 and output amplifier 1800 by sequentially switching ON the horizontal selective transistors 1301 to 1304 through driving the horizontal scanning circuit 1700. In a following horizontal period, another vertical selective transistor is turned ON to select pixels of a different line to repeat the same operations.

Methods for manufacturing the arrangement of this embodiment will now be explained.

As for the semiconductor substrate 1, a SOI (Silicon on Insulator) silicon semiconductor substrate is employed.

In FIG. 5(*e*), 100 denotes a silicon dioxide film that is embedded in the SOI semiconductor substrate 1, and while a thin single crystal silicon layer is formed in advance on the silicon dioxide film 100, this silicon single crystal layer is oxidized to form a silicon dioxide film layer 120 except for portions which form diodes.

125 denotes a remaining crystal single silicon layer which is of p-type in this embodiment. 190 is an etching stop layer which serves as an etching stopper at the time of performing etching silicon in a last process, which is formed by thermally oxidizing its surface after trench etching and embedding a silicon dioxide film or polysilicon.

In FIG. 5(*b*), n-type impurity regions 2a to 2d are formed through ion implantation into the single crystal silicon layer denoted as 125 in FIG. 5(*a*), and simultaneously, p-type regions are divided into 1a to 1d.

Thereafter, after forming a thin oxide film on the single crystal silicon layer 125 (not shown), portions for forming metallic wiring 3a to 3c for short-circuiting thereon are opened, vapor deposition of platinum is performed, and platinum silicide is formed at portions which came in contact with silicon through thermal treatments. After forming the platinum siliside, platinum remaining on the silicon dioxide film can be removed by aqua regia, and the platinum silicide can be formed in a manner of self-aligning.

Then, the metallic wiring 31, 32 are formed and the surface thereof is covered by a silicon dioxide film, a silicon nitride film or a complex film thereof. The platinum silicide may also be formed at contact portions at which the metallic wiring 31, 32 and the single crystal silicon thin-film contact.

In this manner, an etching window for supplying etchant therethrough at the time of performing silicon etching in a final process is formed as to pierce through the insulating films 100, 110, 120 though not shown in the drawings. This etching window assumes a shape of a white bead of FIG. 2.

In FIG. 5(*c*), a sacrificial layer 180 that is later removed by etching is formed, and after removing a portion that is to be the joint column 140 by photolithography, a film that is to be the joint column is formed.

This embodiment is arranged in that film materials which are to be the joint column other than for the aperture portion of the sacrificial layer are removed, these may be formed through selective embedding or through etch back techniques.

However, no inconveniences are caused at all even though members for the joint column remain other than for the joint column portions.

In case polysilicon or amorphous silicon is employed for the sacrificial layer, it is possible to perform etching of the sacrificial layer simultaneously with performing etching for forming the hollow section in the semiconductor substrate 1.

In FIG. 5(*d*), the reflecting film 150, insulating film 130, and infrared absorbing metallic thin-film 160 which are constituent members of the infrared absorbing portion 400 are sequentially formed and patterned.

In case the metallic reflecting film 150 and infrared absorbing metallic thin-film 160 which are exposed to etchants at the time of performing etching of the sacrificial layer 180 and at the time of silicon etching do not exhibit resistivity against the etchants, the infrared absorbing section 400 needs to be covered by insulating films exhibiting resistivity towards etchants from above and from below.

FIG. 5(*e*) is identical to FIG. 1, and by performing silicon etching of the arrangement of FIG. 5(*d*), the sacrificial layer 180 and the semiconductor substrate 1 below the temperature detector section 300 are etched to thereby complete the heat insulating structure.

That is, it is realized for an arrangement wherein the infrared absorbing section 400 for absorbing infrared radiation and converting the same into temperature changes is coupled in a mechanical and thermal manner to the temperature detector section 300 only through the joint column 140 though being disposed thereabove in a remote manner, and the temperature detector section 300 is supported by supporting legs 21, 22 exhibiting high thermal resistance above the hollow section 200 that is formed in the semiconductor substrate 1 through etching in a manner in which they are thermally insulated from the SOI semiconductor substrate 1.

In this case, the lower surface of the temperature detector portion 300 is protected by the silicon dioxide film 100 such that it is not etched.

While processes for forming a peripheral circuit have been omitted in the above explanations, the peripheral circuit may be either formed on the SOI semiconductor substrate 1 or on a portion of the SOI semiconductor substrate 1 from which only a part of the single crystal silicon layer 125 and the silicon dioxide film 100 corresponding to the peripheral circuit portion have been removed.

In the above embodiment, explanations have been made based on a case in which only one joint column 140 has been provided, but there may be provided a plurality of joint columns. This is also true for all of the following embodiments.

Also, while the position of the joint column 140 is arbitrary, it is preferable that this position be one at which the infrared absorbing section 400 can be mechanically supported and at which no large temperature distribution is caused for the infrared absorbing section 400.

A most preferable position at which this condition is met is a position below a center of gravity of the infrared absorbing section 400. This is also true for all of the following embodiments.

Further, it is necessary to design the thickness of the joint column 140 such that it has a thermal resistance that is sufficiently smaller than the thermal resistance of the supporting legs thermally connecting the temperature detector section and the SOI semiconductor substrate 1 such that no large difference is caused between the temperature of the infrared absorbing section 400 and that of the temperature detector section 300. This is also true for all of the following embodiments.

While the infrared absorbing section 400 of the above embodiment is of three-layered arrangement, it may be of single-layered or two-layered arrangement and also be of an arrangement including more than three layers as long as infrared radiation can be absorbed.

The infrared absorbing section 400 needs not to be of single structure wherein all of the layers are arranged continuously, but also of an arrangement wherein a part of the layers are removed.

While the joint column 140 and the infrared absorbing section 400 are arranged as different structures in the above embodiment, the joint column 140 may also be arranged by using at least a part of the members of the infrared absorbing section 400.

While an etching stop layer 190 is provided in the above embodiment, the etching stop layer 190 may also be omitted in case regions which remain free of etching sufficiently remain with regard to etching margins, and the etching stop layer may alternatively be provided only on a part in the periphery of the hollow section 200.

As explained so far, the infrared solid-state imaging elements according to the first embodiment are comprised with an infrared absorbing section 400 that is formed as to correspond to each pixel aligned in a two-dimensional pattern for absorbing incident infrared radiation and converting the same into heat, a temperature detector section 300 that is formed as to correspond to each pixel on a semiconductor substrate 1 and is arranged of a plurality of serially connected silicon pn junction diodes that are biased in forward direction, a hollow section 200 formed in each region on which the temperature detector section is formed on the semiconductor substrate 1, supporting mechanisms (supporting legs 21, 22) that are arranged of materials exhibiting large thermal resistance and which support the temperature detector portion 400 above the hollow section on the semiconductor substrate, and a joint column 140 for holding the infrared temperature absorbing section 400 apart from the detector section 300 while thermally coupling the infrared absorbing section 400 and the temperature detector section 300. With this arrangement, all of manufacturing processes except for eliminating the sacrificial layers can be performed in a silicon VLSI process line, and due to the fact that active elements other than silicon pn junction diodes used in the temperature detectors can be eliminated in pixel portions, infrared solid-state imaging elements can be manufactured in a stable manner which exhibit improved productivity, which are of low cost, and which are highly uniform.

Further, the arrangement of the infrared absorbing section 400 and temperature detector section 300 as separated layers and the provision of the joint column 140 which is a means for mechanically and thermally coupling the infrared absorbing section 400 and temperature detector section 300, the area of the infrared absorbing section 400 which practically determines the aperture ratio can be increased to thereby obtain high aperture ratio and high sensitivity.

Also, by employing a SOI substrate as the semiconductor substrate, the silicon pn junction diodes for detecting the temperature can be easily formed by using crystal Si.

The silicon pn junction diodes of the temperature detector section 300 are formed in that a plurality of silicon pn junction diodes are arranged by alternately forming a p-layer and n-layer on a single crystal silicon layer, and in that the diodes are connected through metallic wiring 3a to 31 between connections in a reverse direction at the time of impressing voltage. With this arrangement, silicon pn junction diodes can be disposed at high density within a restricted region of an area for the pixels, and the number of silicon pn junction diodes can be increased to thereby achieve high sensitivity.

Further, platinum silicide that is formed in a self-alignment manner is used as a metallic wiring 3a to 31 for short-circuiting at an aperture portion of the wiring whereby simplification of processes can be achieved.

The infrared absorbing section 400 is formed of infrared absorbing metallic thin-film 160, insulating layer 130 and metallic reflecting film 150 whereby it can be achieved for improving absorption of infrared radiation by arranging the infrared absorbing section to be thin and to be of an interference absorbing structure, and thus for achieving high sensitivity.

By forming the infrared absorbing section 400 of a layer including an insulating film and a metallic reflecting film, a process of forming the infrared absorbing metallic thin-film 160 can be eliminated such that simplification of manufacturing processes can be achieved.

By forming the joint column 140 of a part of composition members of the infrared absorbing section 400, the joint column 140 can be simultaneously formed with the infrared absorbing section 400 such that simplification of manufacturing processes can be achieved.

Further, by the provision of the etching stop layer 190 exhibiting etching resistivity against an etchant for etching hollow section 200 at peripheral portions of a region for forming the hollow section 200 within the semiconductor substrate 1. With this arrangement, there is no fear that etching is unnecessarily spread, margins between structures that are to be formed on regions to be etched and regions not to be etched can be made small, and high densification of silicon pn junction diodes for temperature detection is enabled owing to the gained regions for the temperature detector section.

Also, constant-current sources 1101 to 1104 one end of which is connected to a fixed potential are provided for each vertical line. With this arrangement, the constant-current sources provide load for detecting output signals for each of the vertical lines, and time for electric conduction can be set to be longer for each single pixel even though the number of pixels is increased whereby reading out of signals can be satisfactorily performed and noise of output signals can be decreased by providing narrow bandwidths.

Second Embodiment

While isotropic etching is performed for forming the hollow section 200 in the SIO semiconductor substrate 1 in the above first embodiment, it is also possible to employ anisotropic etching. In such a case, by utilizing face (100) as the SIO semiconductor substrate 1, the etching speed is abruptly decreased at a stage at which face (111) has appeared despite the absence of an etching stop layer so that etching can be performed without unnecessarily expanding the region for the hollow section.

Figure 6:
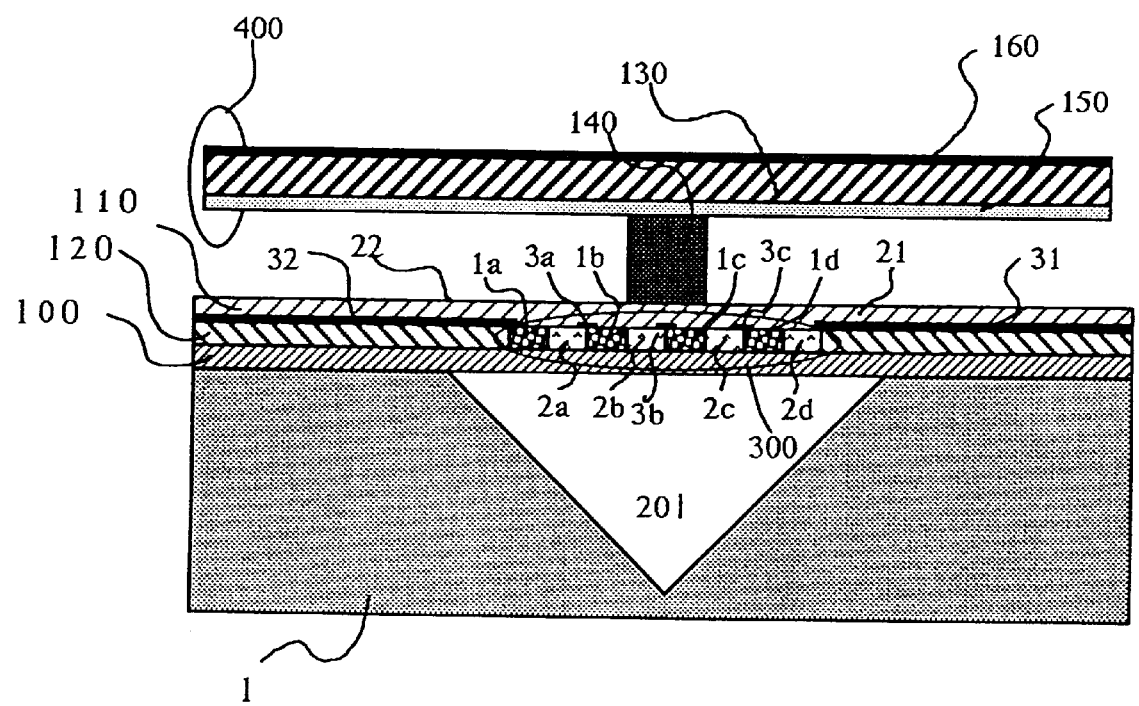
FIG. 6 is a view showing a sectional arrangement of pixels of infrared solid-state imaging elements according to a second embodiment of the present invention.

A sectional shape of pixel portions in such a case is shown in FIG. 6. 201 denotes a hollow section that is formed through anisotropic etching.

Third Embodiment

Figure 7:
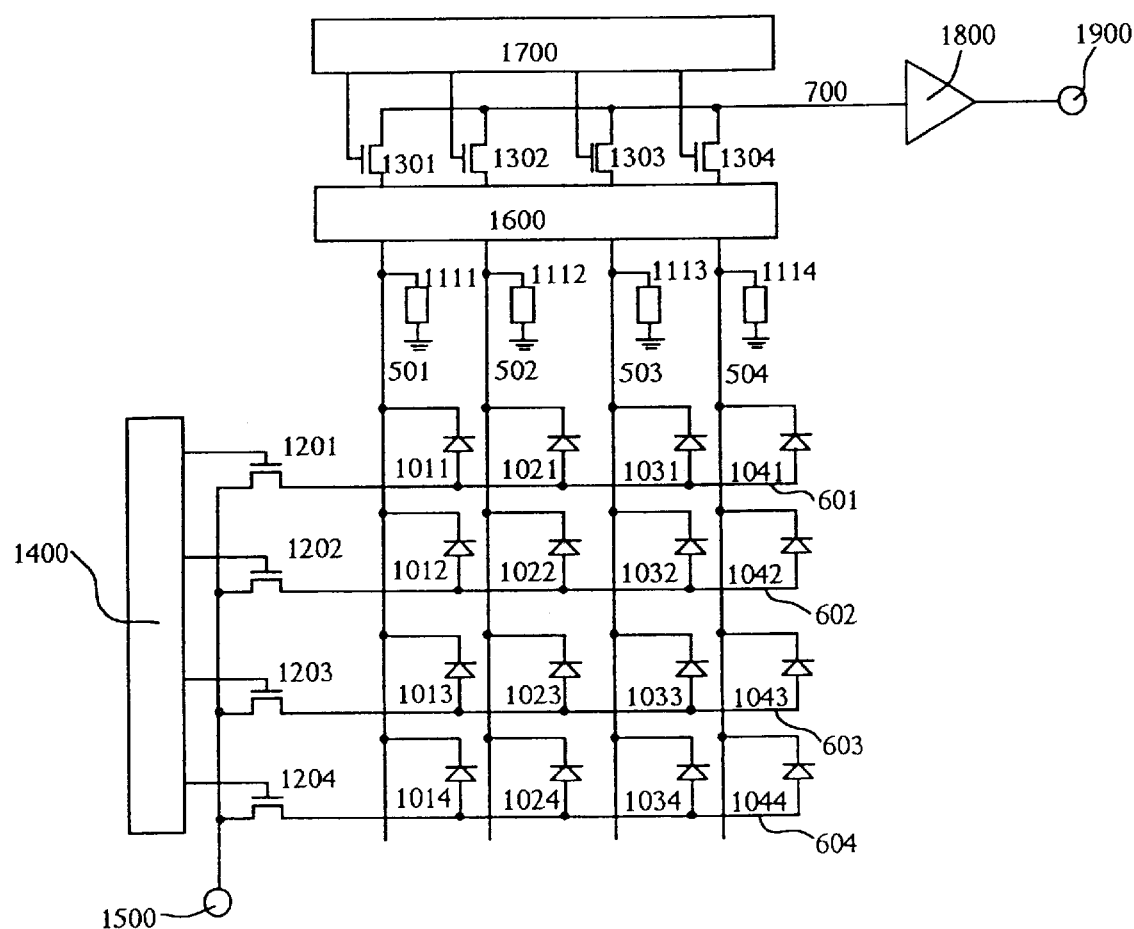
FIG. 7 is a view showing an arrangement of a read out circuit for infrared solid-state imaging elements according to a third embodiment of the present invention.
Figure 8:
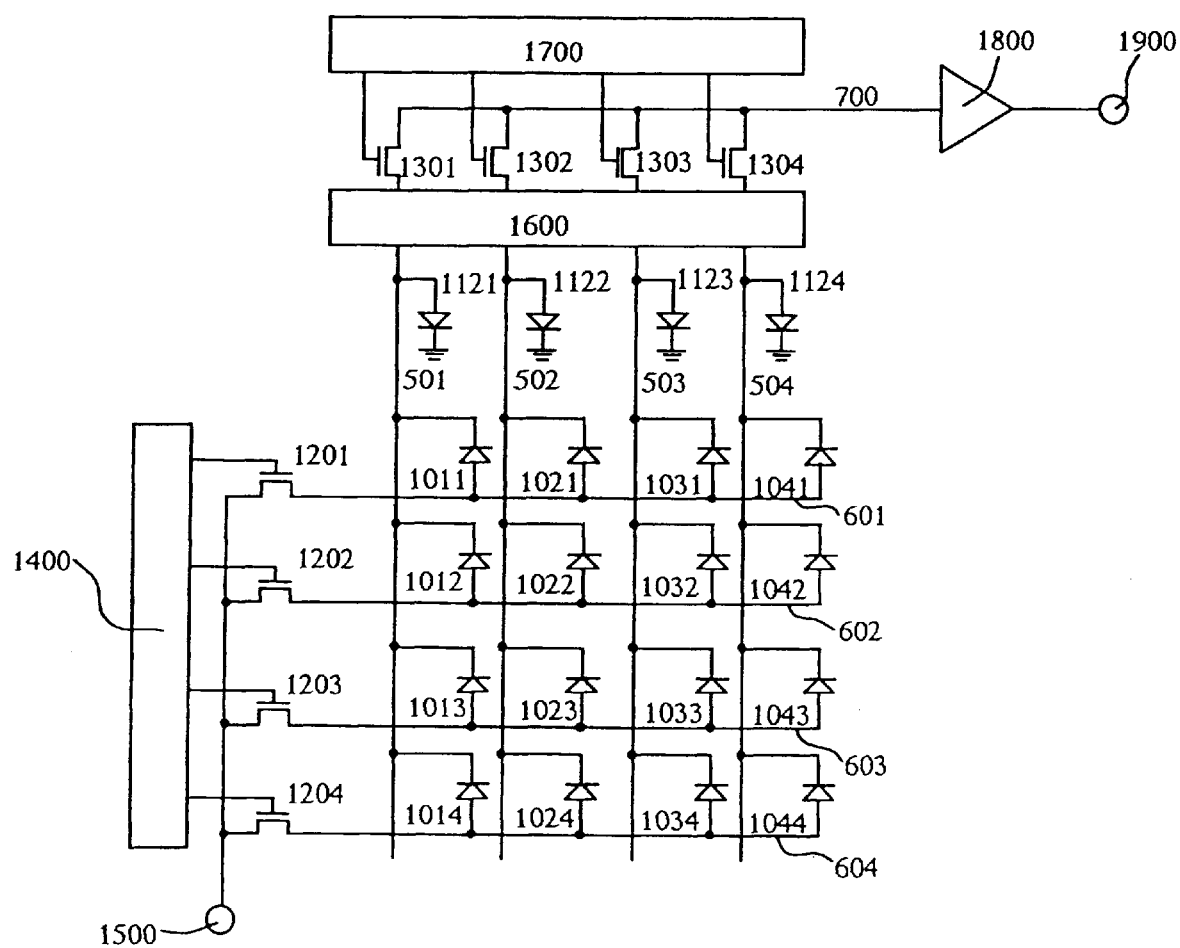
FIG. 8 is a view showing another arrangement of the read out circuit for the infrared solid-state imaging elements according to the third embodiment of the present invention.

While signals have been detected by providing constant-current sources 1101 to 1104 for each line in the first embodiment as shown in FIG. 3, these may also be replaced by load resistances 1111 to 1114 or load diodes 1121 to 1124 as shown in FIG. 7 or FIG. 8.

It should be noted that a case of load through diodes is arranged in that the same number of diodes assuming identical shapes as diodes of the pixel portions are serially connected with the pixel diodes for providing load, and connecting points between the pixel diodes and load diodes are output.

When the hollow section 200 or 201 is not formed below diodes for providing load in such a case, load diodes are thermally well coupled to the semiconductor substrate 1 whereas characteristics of diodes of the pixel portions (that is, the silicon pn junction diodes of the temperature detector section 300) are changed by incident infrared radiation, so that characteristics of the load diodes are hardly changed by incident infrared radiation from the exterior.

Therefore, owing to the differences in characteristics between the diodes of the pixel portions (that is, the silicon pn junction diodes of the temperature detector section 300) and the diodes for providing load upon receipt of incident infrared radiation, outputs are varied.

While characteristics of diodes are determined by the absolute temperature, changes in temperature owing to incident infrared radiation are changed with a temperature of diode elements themselves being a point of origin, and the fact that changes in the temperature of the elements result in changes in the absolute temperature of the pixel diodes (that is, the silicon pn junction diodes of the temperature detector section 300) at the time of receiving incident infrared radiation leads to problems.

However, since changes in characteristics of the load diodes take also place in accordance with the absolute temperature of the elements, it can be compensated for changes in output owing to changes in the temperature of the elements by making the load diodes exhibit identical temperature characteristics as the pixel diodes (that is, the silicon pn junction diodes of the temperature detector section 300).

As explained so far, the infrared solid-state imaging elements according to the third embodiment is arranged in that load resistances for 1111 to 1114 for detecting output signals one end of which is connected to a fixed potential are provided for each vertical line. With this arrangement, the time for electric conduction can be set to be longer for each single pixel even though the number of pixels is increased whereby reading out of signals can be satisfactorily performed and noise of output signals can be decreased by providing narrow bandwidths.

Further, load diodes 1121 to 1124 for detecting output signals one end of which is connected to a fixed potential are provided for each vertical line. With this arrangement, the time for electric conduction can be set to be longer for each single pixel even though the number of pixels is increased whereby reading out of signals can be satisfactorily performed and noise of output signals can be decreased by providing narrow bandwidths.

Also, since the load diodes 1121 to 1124 one end of which is connected to a fixed potential per vertical line are arranged in that the same number of diodes having identical shapes as the silicon pn junction diodes of the temperature detector section 300 for the pixels are serially connected, characteristics are allowed to change similarly to the silicon pn junction diodes of the temperature detector section 300 in accordance with changes in temperature of the elements so that compensation of changes in output owing to changes in temperature of the elements can be performed.

Fourth Embodiment

Figure 9:
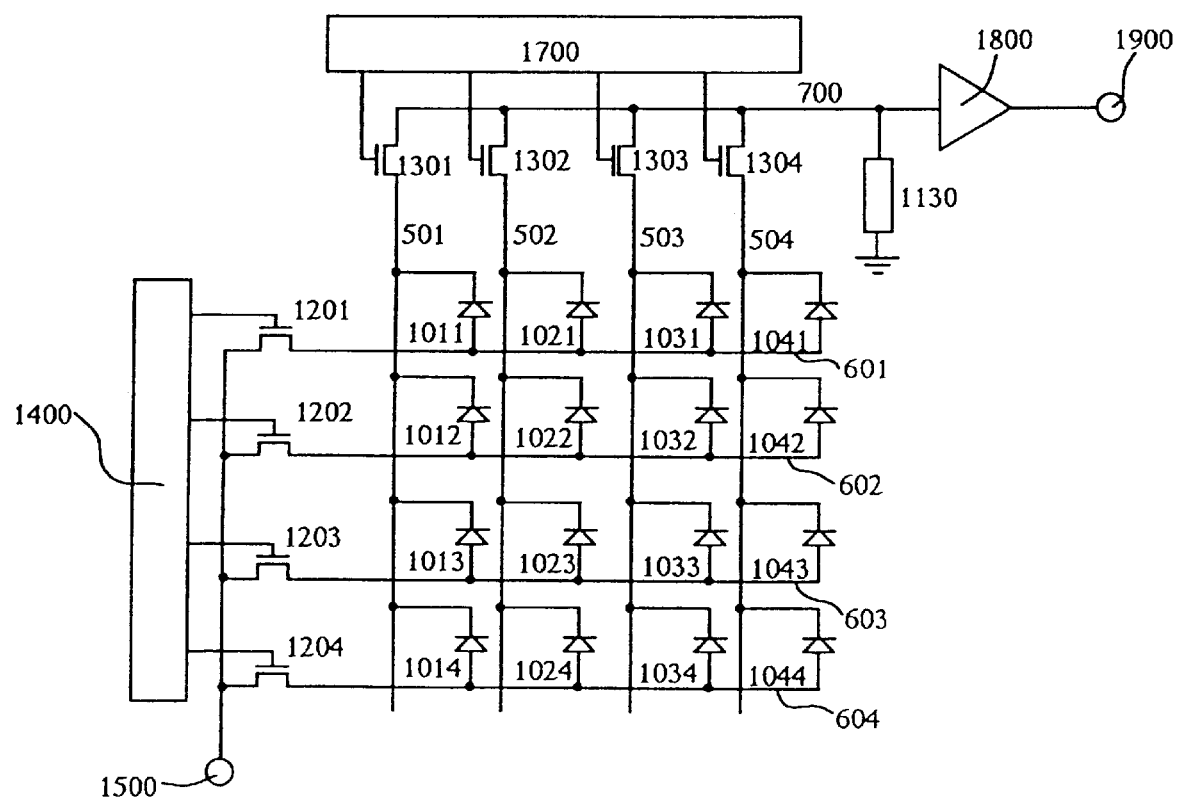
FIG. 9 is a view showing an arrangement of a read out circuit for infrared solid-state imaging elements according to a fourth embodiment of the present invention.

The second embodiment and third embodiment are arranged in that constant-current sources, resistances or diodes are arranged for each row and in that sample-and-holding of signals can be performed in the vertical-horizontal interface section 1600 for temporally storing signals. Alternatively, it is possible to provide a common load 1130 for each of the rows as shown in FIG. 9 that is comprised of either one of the constant-current sources, resistances or diodes which is then connected to the horizontal signal wire 700 row by row through a single horizontal scanning circuit.

In this method, it is necessary to perform electric conduction per pixel, so that in case the number of pixels is increased, time allotted for reading out of a single pixel is shortened so that reading out can not be sufficiently performed or that a bandwidth for a frequency for reading out a single pixel is widened so that noise may be generated. However, in case the number of pixels is small, the utilization of such an arrangement employing common load rather than one providing separate loads for each row is effective in preventing nonuniformity in output owing to nonuniformity in loads for each row such that favorable picture images may be obtained. It should be noted that in case the common load 1130 is comprised of diodes, it is employed an arrangement wherein the same number of diodes of identical shapes as the diodes for the pixel portions (that is, silicon pn junction diodes of the temperature detector section 300) are serially connected to the diodes of the pixel portions to provide load and thus to output connecting points of the pixel diodes and load diodes.

When the hollow section 200 or 201 is not formed below diodes for providing load in such a case, load diodes are thermally well coupled to the semiconductor substrate 1 whereas characteristics of diodes of the pixel portions (that is, the silicon pn junction diodes of the temperature detector section 300) are changed by incident infrared radiation, so that characteristics of the load diodes are hardly changed by incident infrared radiation from the exterior.

Therefore, owing to the differences in characteristics between the diodes of the pixel portions (that is, the silicon pn junction diodes of the temperature detector section 300) and the diodes for providing load upon receipt of incident infrared radiation, outputs are varied.

While characteristics of diodes are determined by the absolute temperature, changes in temperature owing to incident infrared radiation are changed with a temperature of diode elements themselves being a point of origin, and the fact that changes in the temperature of the elements result in changes in the absolute temperature of the pixel diodes (that is, the silicon pn junction diodes of the temperature detector section 300) at the time of receiving incident infrared radiation leads to problems.

However, since changes in characteristics of the load diodes take also place in accordance with the absolute temperature of the elements, it can be compensated for changes in output owing to changes in the temperature of the elements by making the load diodes exhibit identical temperature characteristics as the pixel diodes (that is, the silicon pn junction diodes of the temperature detector section 300).

Further, while the first to fourth embodiments have been explained based on a case in which a SOI semiconductor substrate is employed as a semiconductor substrate 1, it is also possible to employ a semiconductor substrate wherein single crystal silicon is formed through means such as laser re-crystallization on a silicon dioxide film formed on a silicon semiconductor substrate. The silicon dioxide layer needs not be present on the entire surface of the silicon semiconductor substrate but reside only at a region at which the hollow section is to be formed in the semiconductor substrate (more particularly, an underlying surface of the temperature detector section 300), and it is also possible to employ, for instance, a SIMOX arrangement formed by ion implantation of oxygen.

As explained so far, each of the vertical lines of the infrared solid-state imaging elements according to the fourth embodiment are provided with a common load 130 one end of which is connected to a fixed potential via horizontal selective transistors 1301 to 1304, whereby nonuniformity in output signals owing to nonuniformity in load for each vertical line can be eliminated.

Further, the common load 1130 with respect to each of the vertical lines are diodes arranged in that the same number of diodes of identical shape are serially connected as the silicon pn junction diodes of the temperature detector section of the pixels. With this arrangement, nonuniformity in output signals owing to nonuniformity in load for each vertical line can be eliminated and characteristics are varied similarly to silicon pn junction diodes of the temperature detector section in accordance to changes in temperature of the pixels such that the compensation of changes in output owing to changes in pixel temperature is enabled.

Fifth Embodiment

Figure 10:
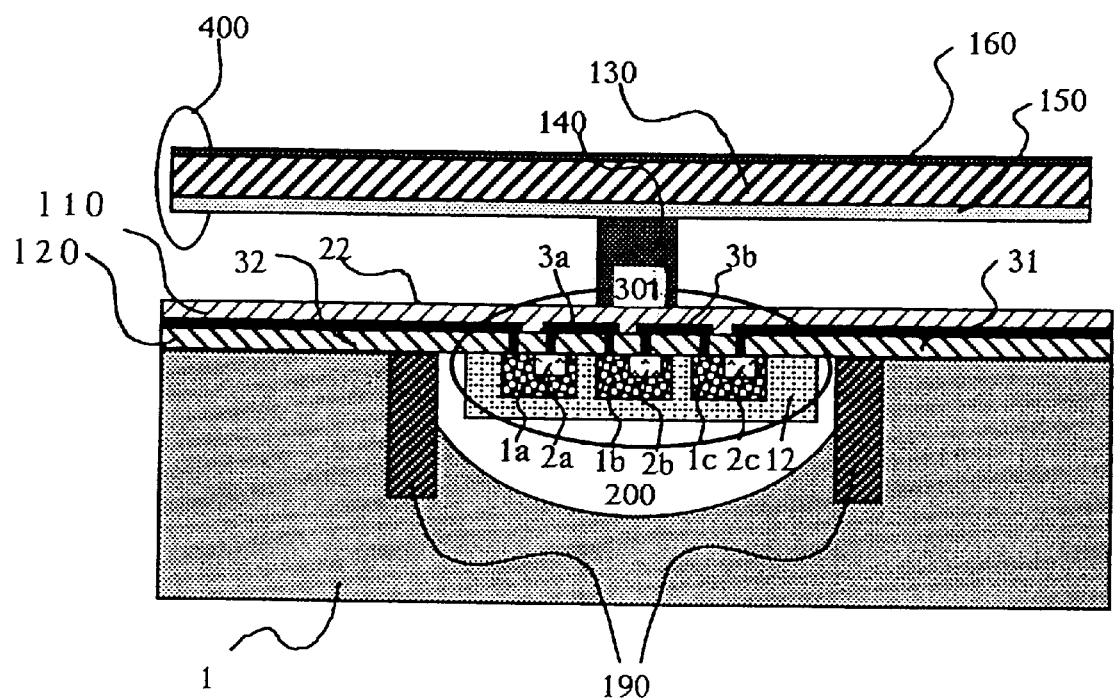
FIG. 10 is a view showing a sectional arrangement of pixels of infrared solid-state imaging elements according to a fifth embodiment of the present invention.
Figure 11:
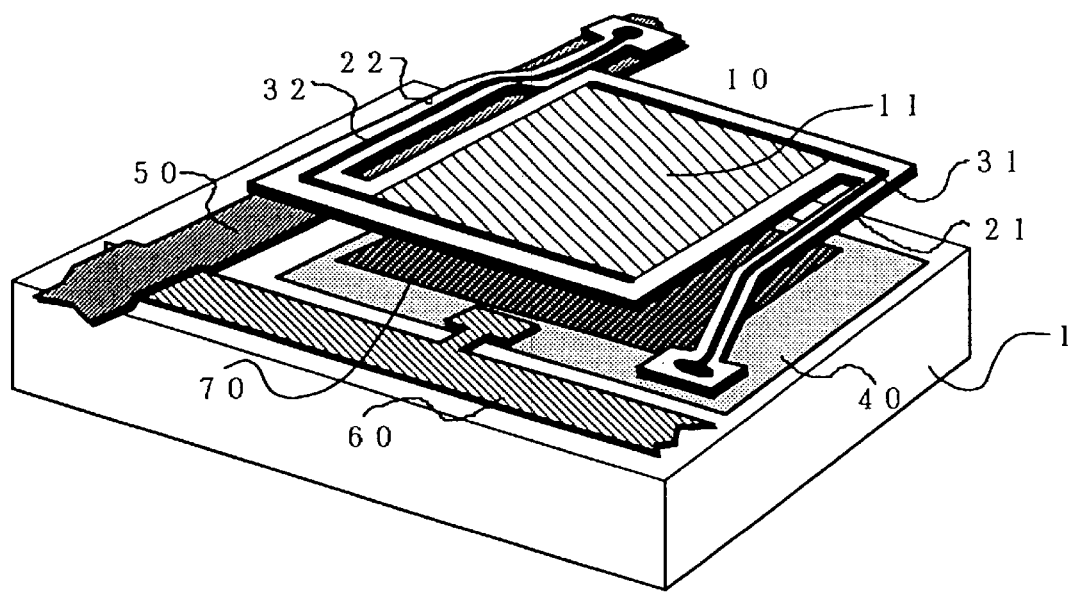
FIG. 11 is a bird's-eye view showing an arrangement of pixels of conventional infrared solid-state imaging elements.
Figure 12:
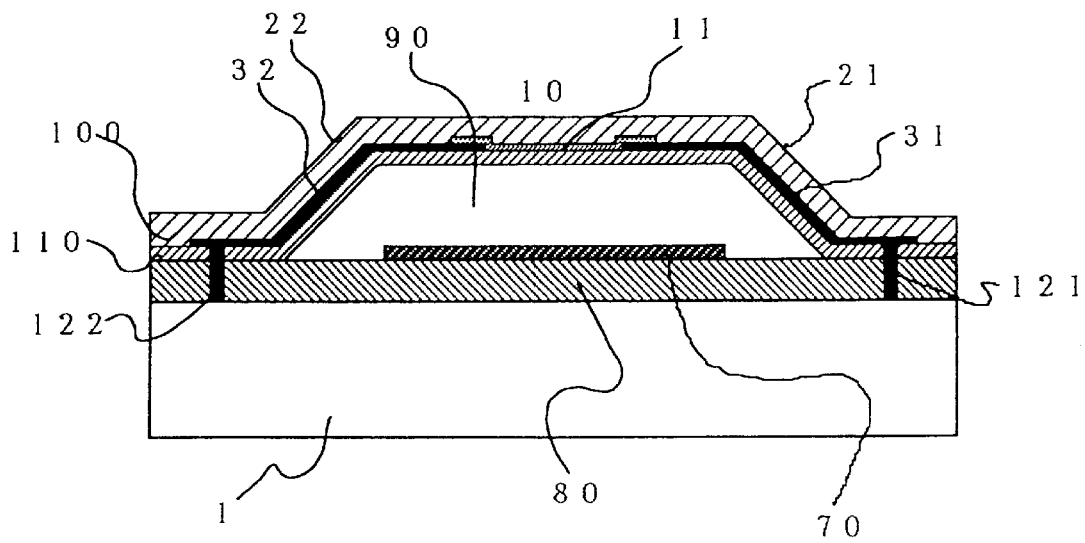
FIG. 12 is a sectional view showing an arrangement of pixels of conventional infrared solid-state imaging elements.

FIG. 10 is a view showing a sectional arrangement of pixels according to a fifth embodiment of the two-dimensional infrared solid-state imaging elements employing a thermal type infrared detector according to the present invention.

In the drawing, 301 denotes a temperature detector section, and as it is evident from the drawing, the arrangement of pixels of the second embodiment is different from that of the first embodiment in that the arrangement of the respective temperature detector sections are different.

In the fifth embodiment, the semiconductor substrate 1 is a p-type silicon semiconductor substrate, and 12 in the temperature detector section 301 denotes a n-type impurity region wherein the pn junction diodes for detecting the temperature are formed in the n-type impurity region 12.

For forming the hollow section 200 in the semiconductor substrate 1, it is employed for an electrolytic etching method as disclosed in "Micro-machining and Micro-mechatronics" by Esashi, Fujita, Igarashi and Sugiyama (BAIFUUKANN), p.19–p.20.

In an electrolytic etching method, n-type impurity regions remain without being etched while the p-type silicon semiconductor substrate is etched so that an arrangement as shown in FIG. 10 can be obtained.

In FIG. 10, 1a, 1b, 1c comprise p-type impurity regions, 2a, 2b, 2c n-type impurity regions, and 1a–2a, 1b–2b, 1c–2c pn diodes for temperature detection.

The respective pn diodes are serially connected by the metallic wiring 3a, 3b. The n-type impurity regions 2a, 2b, 2c and the p-type impurity regions 1a, 1b, 1c are applied with voltage in that they are respectively biased in reverse directions. Similarly to the first embodiment, the more pn diodes are serially connected, the higher the sensitivity becomes.

The infrared solid-state imaging elements employing the pixels of this embodiment can be operated by the same circuit as shown in the first embodiment.

As explained so far, according to the infrared solid-state imaging elements according to the fifth embodiment, it is employed for a p-type semiconductor substrate as the semiconductor substrate 1 and the plurality of silicon pn junction diodes of the temperature detector section 301 that are serially connected and biased in a forward direction are formed within a layer of the n-type impurity region 12 provided above the p-type semiconductor. With this arrangement, no insulating film is required below the temperature detector section 301, electrolytic etching can be performed and conventional substrates that are cheaper than SOI substrates can be employed as semiconductor substrates.

As explained so far, the infrared solid-state imaging device according to the present invention is suitable for realizing infrared solid-state imaging elements of improved productivity, of low cost and of high uniformity wherein all processes except for a process of eliminating a sacrificial layer can be performed in a conventional silicon VLSI manufacturing line by forming silicon pn junction diodes for pixel portions exhibiting both functions of temperature detection and pixel selection.

What is claimed is:

1. An infrared solid-state imaging element formed corresponding to each pixel of a two-dimensional imaging array comprising:

an infrared absorbing section formed corresponding to each pixel of an two-dimensional imaging array and converting incident infrared radiation into heat;

a temperature detector section formed corresponding to each pixel on a semi-conductor substrate having a plurality of pn junction diodes connected in series and biased in forward direction;

a hollow section formed under each temperature detector section;

a supporting leg having a large thermal resistance and supporting each temperature detector section on each hollow section;

a joint column holding the infrared absorbing section on the temperature detector section in a separate manner and thermally connecting the infrared absorbing section and the temperature detector section.

2. The infrared solid-state imaging element of claim 1, wherein a SOI (silicon on insulator) substrate is used as the semiconductor substrate.

3. The infrared solid-state imaging element of claim 1, wherein the pn junction diodes of the temperature detector section are formed in a single crystal silicon layer in a form of a plurality of p-type layers and n-type layers arranged alternatively and each connection between the p-type layer and n-type layer biased in reverse direction when applied with a voltage is connected with metal wiring.

4. The infrared solid-state imaging element of claim 3, wherein the metal wirings connecting the pn junction diodes are formed of platinum silicide.

5. The infrared solid-state imaging element of claim 1, wherein the pn junction diodes of the temperature detector section are formed in n-type region embeded in p-type semiconductor substrate.

6. The infrared solid-state imaging element of claim 1, wherein the infrared absorbing section is comprised of a infrared absorbing metal thin film, an insulating film, and a reflecting metal film.

7. The infrared solid-state imaging element of claim 1, wherein the infrared absorbing section is comprised of an insulating film and a reflecting metal film.

8. The infrared solid-state imaging element of claim 1, wherein the joint column is formed from the same material as the material used to form the infrared absorbing section.

9. The infrared solid-state imaging element of claim 1, wherein the hollow section is provided with an etching stoper layer around its periphery.

10. The infrared solid-state imaging element of claim 1, wherein a constant current source having one end connected to a fixed potential is provided for each vertical line of the two-dimensional pixel array.

11. The infrared solid-state imaging element of claim 1, wherein a resistor having one end connected to a fixed potential is provided for each vertical line of the two-dimensional pixel array.

12. The infrared solid-state imaging element of claim 1, wherein diodes having one end connected to a fixed potential are provided for each vertical line of the two-dimensional pixel array.

13. The infrared solid-state imaging element of claim 12, wherein the diodes comprise a plurality of identical diodes to the diodes used in the temperature detector section in number and shape.

14. The infrared solid-state imaging element of claim 1, wherein each vertical line of the two-dimensional pixel array is connected to a common load through a respective horizontal scanning transistor.

15. The infrared solid-state imaging element of claim 14, wherein the common load comprises a plurality of identical diodes to the diodes used in the temperature detecting section in number and shape.

* * * * *